I. R. GILBERT.
Wheel-Plows.
No. 158,207. Patented Dec. 29, 1874.
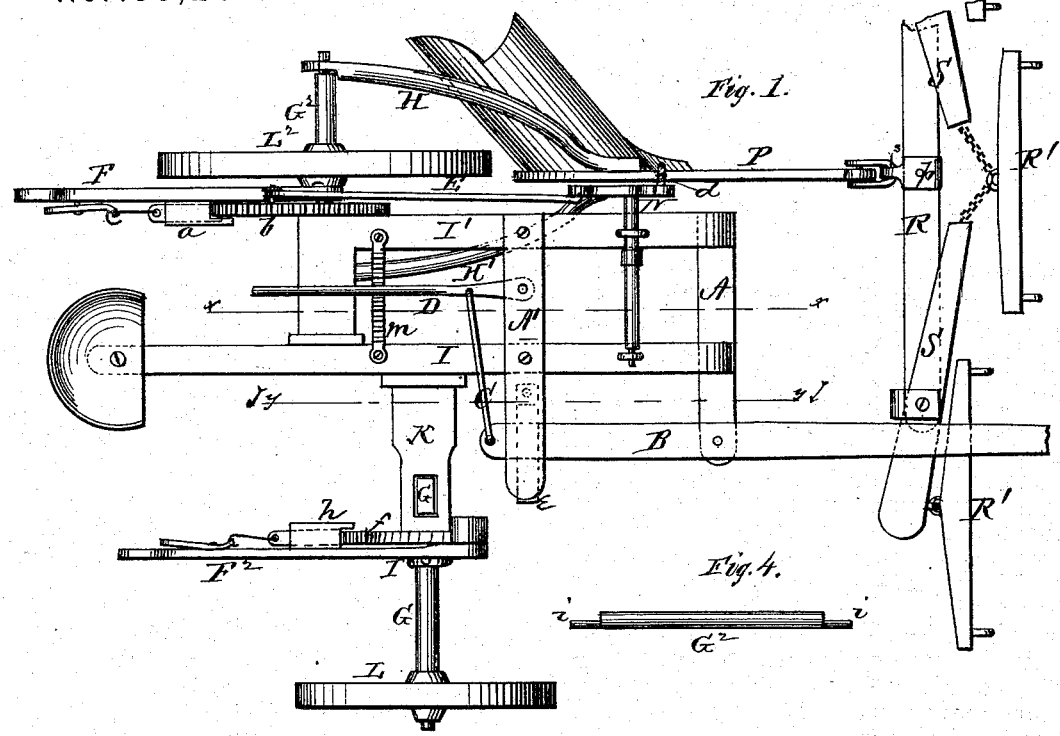
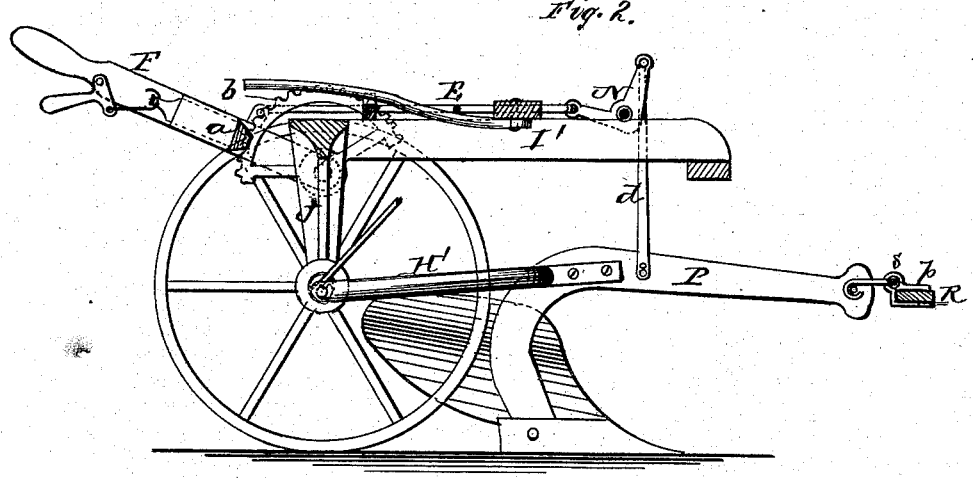
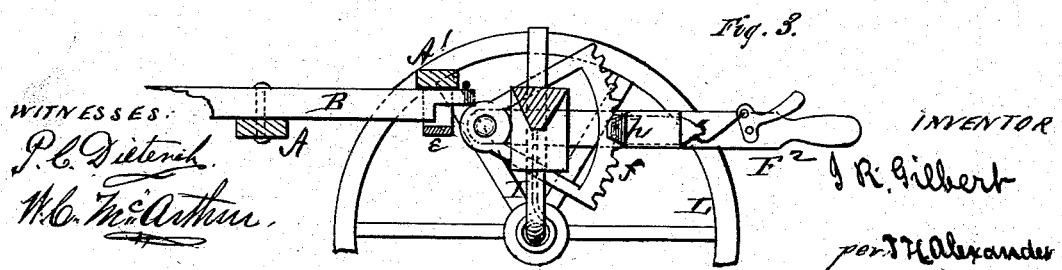

UNITED STATES PATENT OFFICE.

ISAAC R. GILBERT, OF CHAMPAIGN, ILLINOIS.

IMPROVEMENT IN WHEEL-PLOWS.

Specification forming part of Letters Patent No. 158,207, dated December 29, 1874; application filed November 5, 1874.

*To all whom it may concern:*

Be it known that I, I. R. GILBERT, of Champaign, in the county of Champaign and State of Illinois, have invented certain new and useful Improvements in Wheel or Sulky Plows; and I do hereby declare that the following is a full, clear, and exact description thereof, reference being had to the accompanying drawings, and to the letters of reference marked thereon, which form part of this specification.

The nature of my invention consists in certain improvements on the sulky-plow patented by me May 19, 1874, as will be hereinafter more fully set forth.

In order to enable others skilled in the art to which my invention appertains to make and use the same, I will now proceed to describe its construction and operation, referring to the annexed drawing, in which—

Figure 1 is a plan view of my improved sulky-plow. Fig. 2 is a longitudinal section of the same through the line $x\ x$, Fig. 1. Fig. 3 is a section through the line $y\ y$, Fig. 1.

I I' represent two parallel beams connected at their front ends by a cross-bar, A. At the rear end of the beam I', and connecting the two beams, is a casting with a downward-projecting arm, J, through the lower end of which the spindle $G^2$ is passed. On the side of the beam I is an arm, K, formed with a box at its outer end, through which the vertical part of the L-shaped spindle G is passed. L $L^2$ are the two wheels, placed respectively on the spindles G and $G^2$. F is a hand-lever, pivoted to the outside of the beam I' at the rear end, and provided with a spring-pawl, $a$, to take into a segmental ratchet, $b$. This lever is, by a rod, E, connected with an elbow-lever, N, and this latter is, by a rod, $d$, connected with the plow-beam P. By this device the plow is graduated to depth, either deep or shallow, and at the same time held firmly in the ground at any required depth, at both heel and point. By this device the plow is also raised out of the ground and carried. On top of the beams I I' is fastened a cross-bar, A', and the two cross-bars, A A', are extended a sufficient distance beyond the main beam I to receive the tongue B upon the end of A and under the end of A', and by means of a stirrup, $e$, on the under side of the latter passing around the end of the tongue B, the tongue is made independent of the main frame. The tongue is, by a rod, C, connected with a lever, D, held in a ratchet, $m$. The tongue is pivoted on the end of the cross-bar A, and by means of the devices just described it becomes both rigid and flexible.

By moving the lever D from one side to the other the plowman is enabled to guide the plow either to or from land without stopping to make a change.

$F^2$ is a lever, pivoted to the arm K, and held by a ratchet, $f$, and pawl $h$. It is connected, by a rod, I, with the spindle G, whereby the plowman is enabled to compensate for the depth of furrow, in which the plow and furrow-wheel runs, thus having the plow and sulky level in running at any required depth by raising the lever $F^2$, thus raising the vertical part of the spindle G. After this is accomplished the plowman can raise or lower the lever F to compensate for any uneven surface that the wheel L on the spindle G may come in contact with, and thus the plow is winged from land-side to share, or from share to land-side. The spindle $G^2$ is extended outside of the wheel $L^2$, and curved braces H H', which are bolted firmly to the plow-beam P, are pivoted on the ends of said spindle, thus holding the plow firmly to its place, and also allowing the plow to be adjusted, as required, by means of the ends of the spindle $G^2$ forming eccentrics $i\ i$, as shown in Fig. 4.

The plow can be raised at the heel by turning the spindle $G^2$, so that the plowman can compensate for the amount that the wheel $L^2$ may sink into the ground.

R represents the main swing-tree, immediately on the upper surface of which are placed the equalization-bars S S, thus making the hitch much shorter than in ordinary swing-trees. The swing-tree is provided with a clip, $p$, passing around the center, and said clip is formed with an eye, $s$, to connect it to the plow-beam. This eye is set up, as shown in Fig. 2, whereby the draft is brought on a parallel line with equalizing-bars S and the short swing-trees R', thus making it easy on the bolts, and the draft more uniform.

Having thus fully described my invention, what I claim as new, and desire to secure by Letters Patent, is—

1. The extended spindle $G^2$, provided with eccentric pins $i$ $i$ at its ends, in combination with the braces H H' and plow-beam P, as and for the purposes herein set forth.

2. The lever $F^2$, with its ratchet devices $f$ $h$, rod I attached to the lever, the spindle G, and arm K, having a socket, all combined substantially as and for the purpose set forth.

3. The braces H H', bolted or secured rigidly to the plow-beam, and pivoted to either end of spindle $G^2$, for the purpose of holding the plow-beam in place.

In testimony that I claim the foregoing as my own I affix my signature in presence of two witnesses.

ISAAC R. GILBERT.

Witnesses:
   F. T. WALKER,
   J. W. MULLIKEN.